United States Patent
Shin et al.

(10) Patent No.: US 6,634,612 B1
(45) Date of Patent: Oct. 21, 2003

(54) TENSION MASK FRAME ASSEMBLY OF FLAT CATHODE RAY TUBE

(75) Inventors: Soon-Cheol Shin, Suwon (KR); Sang-shin Choi, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 172 days.

(21) Appl. No.: 09/644,795

(22) Filed: Aug. 24, 2000

(30) Foreign Application Priority Data

Dec. 9, 1999 (KR) .......................................... 1999-56151

(51) Int. Cl.[7] .............................................. A47B 91/00
(52) U.S. Cl. .................................. 248/346.01; 313/407
(58) Field of Search ....................... 248/346.01, 346.02; 313/407, 402

(56) References Cited

U.S. PATENT DOCUMENTS

| | | | | |
|---|---|---|---|---|
| 3,737,703 A | * | 6/1973 | Tsuneta et al. | 313/407 |
| 5,751,098 A | * | 5/1998 | Ito et al. | 313/402 |
| 6,046,534 A | * | 4/2000 | Horiuchi | 313/402 |
| 6,046,535 A | * | 4/2000 | Jung | 313/402 |
| 6,054,803 A | * | 4/2000 | Saita | 313/402 |
| 6,268,688 B1 | * | 7/2001 | Tani et al. | 313/402 |
| 6,271,624 B1 | * | 8/2001 | Taguchi et al. | 313/402 |

OTHER PUBLICATIONS

Takayanagi Pub No. 17,512 of Aug. 30, 2001.*

* cited by examiner

*Primary Examiner*—Ramon O. Ramirez
(74) *Attorney, Agent, or Firm*—Lowe Hauptman Gilman & Berner LLP

(57) ABSTRACT

A flat tension mask frame assembly is provided, including a frame and a tension mask. The frame has first and second support members which are separated from each other by a predetermined distance, and have fixing portions and flange portions which are bent inwardly from the fixing portions and become narrower from the center portion to both ends of the flange portions, and at least two elastic members fixed at both ends to the first and second support members for supporting the support members. The tension mask has facing edges which are fixed to the fixing portions of each of the first and second support members in a state where a tensile stress has been applied to the facing edges.

11 Claims, 3 Drawing Sheets

TENSION MASK FRAME ASSEMBLY OF FLAT CATHODE RAY TUBE

BACKGROUND OF THE INVENTION

1. Field of the Invention

The present invention relates to a flat cathode ray tube (CRT), and more particularly, to a tension mask frame assembly having an improved frame for supporting a tension mask having a color distinction function.

2. Description of the Related Art

In color cathode ray tubes (CRTs), three electron beams emitted from an electron gun land on red, green and blue fluorescent materials on a fluorescent film, which is formed on the screen surface of a panel, through electron beam passing holes of a shadow mask which has a color distinction function, and excite the fluorescent materials, whereby a picture is formed.

Recent color CRTs pursue a flat screen surface to widen the viewing angle of a picture and prevent distortion of a picture, which requires flattening of a mask which is installed within a CRT and has a color distinction function. The mask becomes an obstacle in fabricating a completely-flat CRT.

FIG. 1 shows an example of a tension mask frame assembly of a flat CRT.

As shown in FIG. 1, the tension mask frame assembly includes a frame 10 and a flat tension mask 20. The frame 10 includes first and second support members 11 and 12 which are parallel, and first and second elastic members 13 and 14, the ends of which are fixed to the first support member 11 and the second support member 12, to maintain an equal distance between the first and second support members 11 and 12. The flat tension mask 20 has facing longer sides which are welded to the support members 11 and 12 so that tension is applied to the support members 11 and 12, and has rows of slits 22 separated by strips 21.

The flat strips 21 are connected to each other at predetermined intervals by tie bars 23, such that the slits 22 are formed.

In the tension mask frame assembly, the flat tension mask 20 is supported by the first and second support members 11 and 12 in a state where a great tensile stress is applied to the flat tension mask 20, such that a non-uniform tensile stress is applied to areas on the first and second support members 11 and 12.

That is, in order to weld the flat tension mask 20 to the first and second support members 11 and 12 of the frame 10, the firsts and second support members 11 and 12 are pressurized from both sides and are displaced in a facing direction, whereby the first and second elastic members 13 and 14 are pressurized and elastically deformed. In this state, both longer sides of the flat tension mask 20 are welded to the first and second support members 11 and 12, and pressure to the first and second support members 11 and 12 are eliminated. Here, the restoring force of the first and second support members 11 and 12 is different at areas, which are supported by the first and second elastic members 13 and 14, and at their center areas.

The difference in restoring force is shown as a difference in tensile stress applied to each strip on a tension mask. As shown in graph A of FIG. 2, portions of the tension mask 20 which are supported by the first and second elastic members 13 and 14 are subjected to much stress, while the strips 21 farther away from the portions supported by the first and second elastic members 13 and 14 are subjected to less tensile stress.

Due to the difference in tensile stress, the tension mask 20 cannot absorb a sufficient amount of thermal expansion at the center portion upon thermal expansion by an electron beam, and the tension mask 20 is partially shrunk or expanded by a non-uniform tension, so that slits 22 traversed by electron beams are deformed. The deformation of the slits 22 hinders accurate landing of an electron beam emitted from an electron gun in a CRT to a fluorescent film.

Therefore, the tension mask passes a different number of electron beams through slits in different areas, and thus cannot obtain a uniform resolution of a picture at different areas. Also, a portion of the tension mask, to which a relatively small tensile stress is applied, vibrates severely even with a small external impact, thus causing screen jitter.

SUMMARY OF THE INVENTION

To solve the above problem, an objective of the present invention is to provide a tension mask frame assembly for a flat CRT having an improved color distinction function of an electron beam, in which the structural intensity of a support member constituting a frame is improved to prevent partial distortion of the tension mask due to the non-uniformity of a tensile stress applied to the tension mask fixed to the support member.

To achieve the above objective, a flat tension mask frame assembly according to an aspect of the present invention is provided, including: a frame having first and second support members which are separated from each other by a predetermined distance, and have fixing portions and flange portions which are bent inwardly from the fixing portions and become narrower from the center portion to both ends of the flange portions, and at least two elastic members each fixed at both ends to the first and second support members for supporting the support members; and a tension mask, facing edges of which are fixed to the fixing portions of each of the first and second support members in a state where a tensile stress has been applied to the facing edges.

To achieve the above objective, a flat tension mask frame assembly according to another aspect of the present invention is provided, including: a frame having first and second support members which are separated from each other by a predetermined distance, and have fixing portions which are bent at predetermined curvatures outwardly in an opposite direction, and flange portions which are bent inward at predetermined angles from the fixing portions while becoming wider from the support portions of the elastic members to the center portion, and at least two elastic members each fixed at both ends to the first and second support members for supporting the support members; and a tension mask, facing edges of which are fixed to the fixing portions of each of the first and second support members in a state where a tensile stress has been applied to the facing edges.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 1:
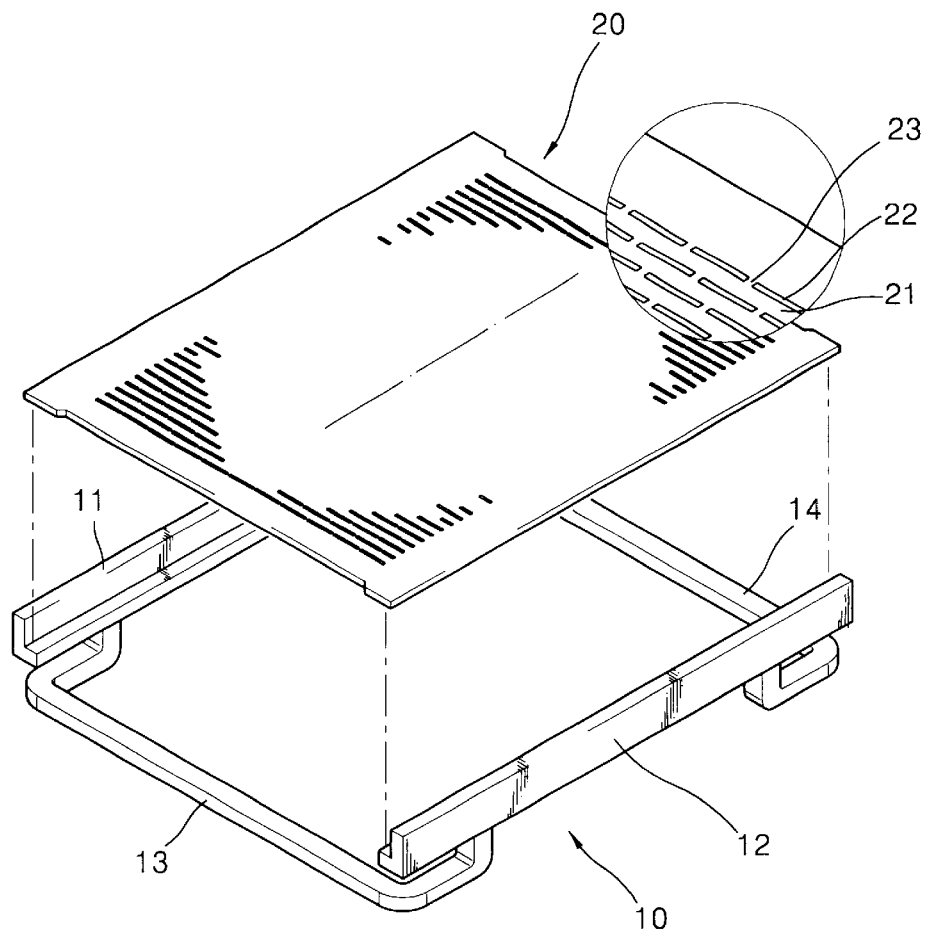
FIG. 1 is a perspective view of a mask frame assembly for a conventional flat CRT.
Figure 2:
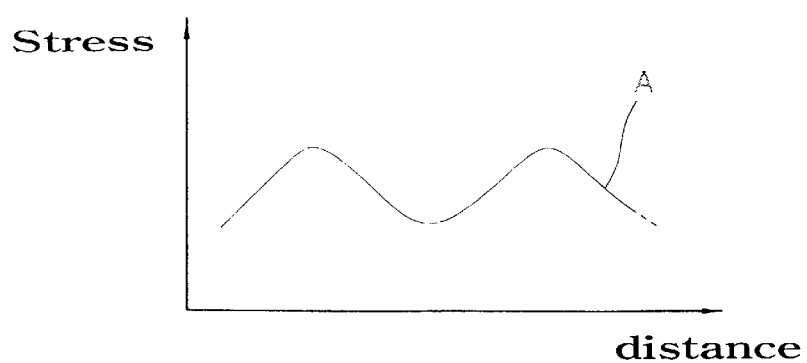
FIG. 2 is a graph showing a tensile stress applied to a tension mask supported by a frame.
Figure 3:
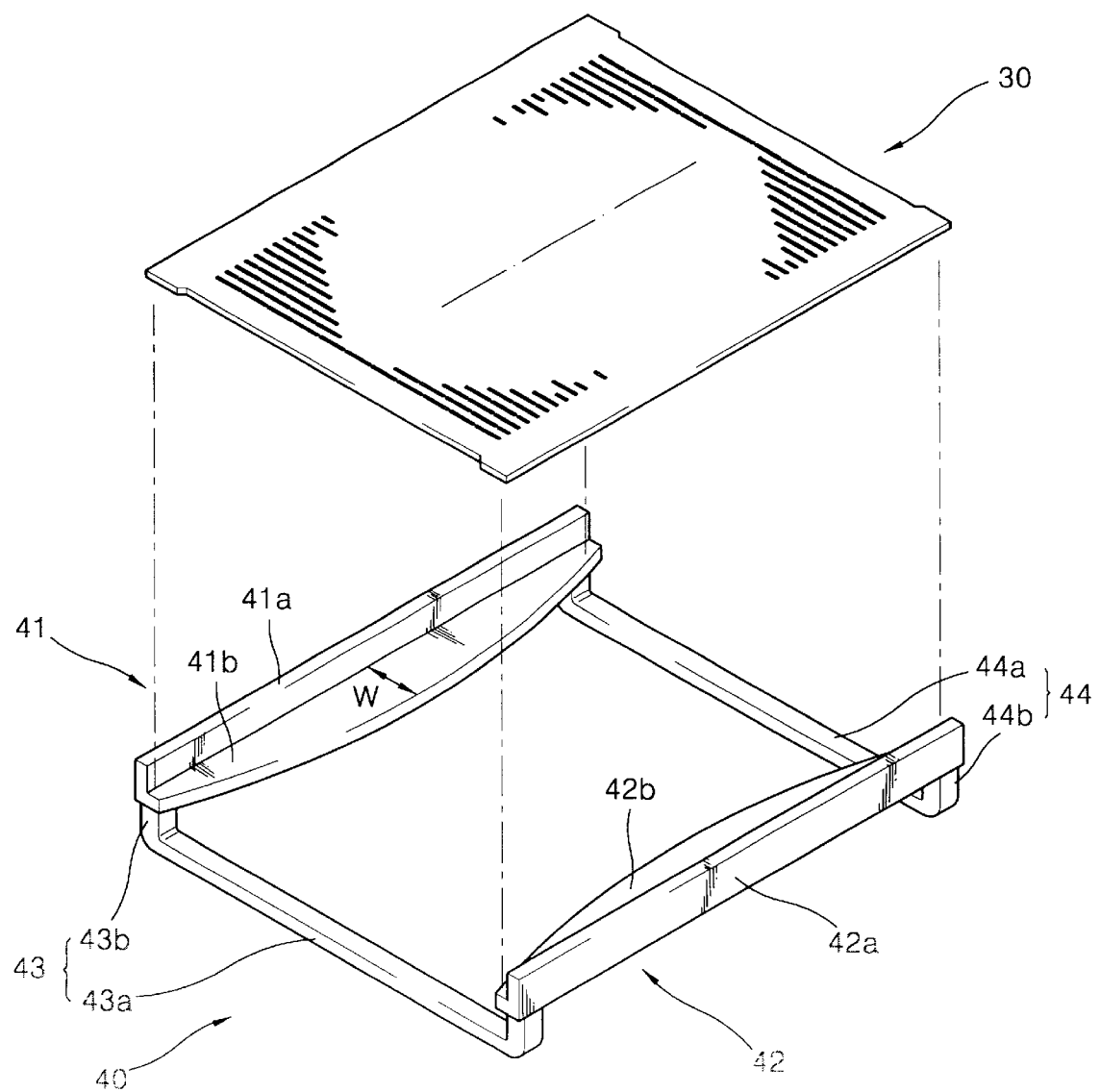
FIG. 3 is an exploded perspective view of a tension mask frame assembly according to an embodiment of the present invention.

As shown in FIG. 3, a tension mask frame assembly for a flat color cathode ray tube (CRT) according to the present invention includes a tension mask 30 for distinguishing the colors of electron beams, and la frame 40 for supporting the tension mask 30 so that a uniform tensile stress is applied to the tension mask.

The frame 40 includes first and second support members 41 and 42 which are isolated from each other by a predetermined distance, and first and second elastic members 43 and 44, the ends of which are supported by the first and second support members 41 and 42 The f and second support members 41 and 42 have fixing portions 41a and 42a and flange portions 41b and 42b, respectively, which are curved inward and extend from the bottom of the fixing portions 41a and 42a. Accordingly, each of the first and second support members 41 and 42 has an L-shaped cross-section, and the flange portions 41b and 42b become narrower from the center portion to the ends.

To be more specific, the flange portions 41b and 42b become wider as the first and second support members 41 and 42 become far from portions supported by both ends of each of the first and second elastic members.

The first and second elastic members 43 and 44 have extensions 43a and 44a, the ends of which are bent perpendicular to the first and second support members, and support portions 43b and 44b bent upward from the ends of the extensions 43a and 44a.

Figure 4:
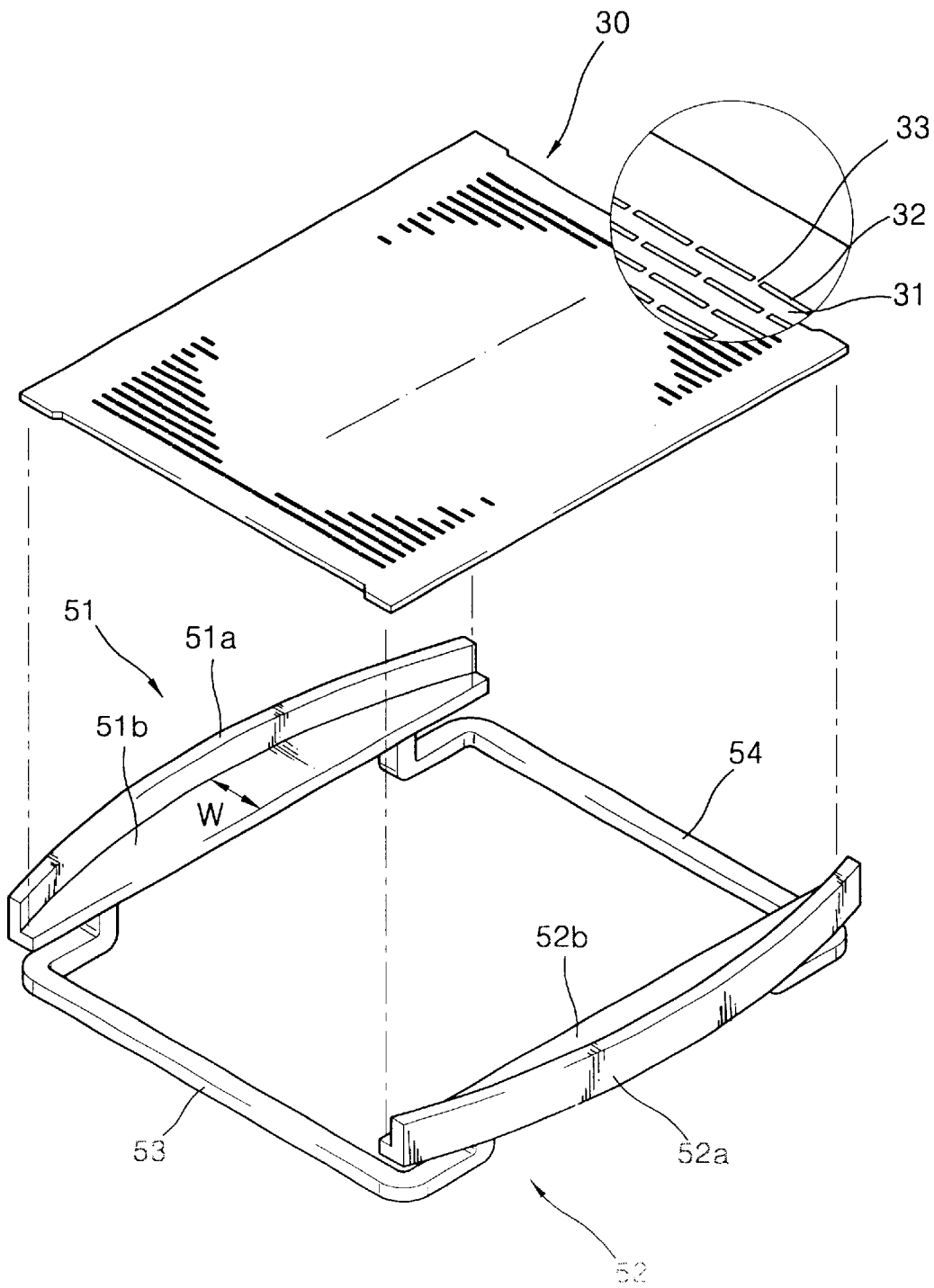
FIG. 4 is an exploded perspective view of a tension mask frame assembly according to another embodiment of the present invention.

FIG. 4 is an exploded perspective view of a tension mask frame assembly according to another embodiment of the present invention.

As shown in FIG. 4, a fame 50 includes first and second support members 51 and 52 which are separated from each other by a predetermined distance, and elastic members 53 and 54, the ends of which are coupled to the first support member 51 and the second support member 52, for supporting the first and second support members 51 and 52. The first and second support members 51 and 52 include first and second fixing portions 51a and 52a which support corresponding edges of the tension mask 30 and have predetermined curvatures outwardly in an opposite direction, and flange portions 51b and 52b extending inwardly from the first and second fixing portions 51a and 52a. The flange portions 51b and 52b become narrower from the center portions toward the elastic members 53 and 54. In this embodiment, each of the first and second fixing portions 51a and 52ahas a predetermined curvature, such that the edge of the free end of each of the flange portions is rectilinear.

The tension mask 30, which is supported by the frame configured as described above, is formed by etching a thin plate, and has slits 32, through which an electron beam passes, formed by the formation of a plurality of strips 31 at a predetermined interval. Longer sides of the tension mask 30 having strips 31, that is, those where a no-hole portion is formed by connection of strips 31, are welded to the fixing portions 41a and 42a of the first and second support members or to the fixing portions 51a and 52a of the first and second support members 51 and 52, in a state where the tension mask is subjected to a greater tensile stress in the direction of the length of the strips 31 from the ends of the tension mask to the center thereof. Here, the width of slits 32 formed by the strips 31 can be controlled by an angle at which an electron beam is deflected by a deflection yoke and passes, or the like. Also, a plurality of tie bars 33 for connecting adjacent strips 31 to each other by crossing the slits 32 may be formed between the strips 31. The number of tie bars 33 can be determined in consideration of the length of the slits 32 and the maintenance state of the interval between strips 31. It is preferable that the tie bar 33 has a width large enough that an afterimage does not appear when an electron beam emitted from an electron gun lands on a fluorescent film (not shown) through an adjacent slit 32 partitioned by the tie bars 33.

In the operation of a flat tension mask frame assembly according to the present invention configured as described above, the first and second support members 41 and 42 are pressurized in a direction where the support members face each other, so that the first and second elastic members 43 and 44 for supporting the first and second support members 41 and 42 are elastically deformed. In this state, the longer sides of the tension mask 30 are 1welded to the fixing portions 41a and 42a of the first and second support members 41 and 42, respectively. When this welding is completed, pressures to the first and second support members 41 and 42 are eliminated, so that the tension mask 30 is subjected to a tensile stress by the first and second elastic members 43 and 44.

The non-uniform distribution of a tensile stress applied to the tension mask can reduce the deformability of the support members 41 and 42 due to a tension of the tension mask 30 since the width (W) of the flange portions 41b and 42b of the first and second support members 41 and 42 becomes greater as the flange portions get farther from the support portions of the elastic members 43 and 44. That is, the cross-section coefficient of the centers of the first and second support members 41 and 42, which are the farthest from the support portions of the elastic members 43 and 44, is greater than that of relativiely-narrow portions of the first and second support members 41 and 42 supported by the elastic members. Thus, deformation of the center having a weak support of the elastic members can be reduced.

As described above, when the fixing portion for fixing the tension mask 30 are bent to have a predetermined curvature in a direction of tension of the tension mask, and the width of the flange portions increases as the flange portions become farther away from the support portions of the elastic members, the weak supporting force for the center portion of the tension mask can be improved due to an increase in resistivity against the deformability of the fixing portions and the deformation of the flange portions.

In a tension mask frame assembly for a flat CRT according to the present invention configured as described above, first and second support members have flange portions whose widths are not uniform,.such that partial imbalance of a tension due to the difference in supporting force to the first and second support members can be prevented.

Although the invention has been described with reference to a particular embodiment, it will be apparent to one of ordinary skill in the art that modifications of the described embodiment may be made without departing from the spirit and scope of the invention.

What is claimed is:

1. A tension mask-frame assembly, comprising:
   a frame comprising
      two support members spaced from each other, each of said support members comprising a fixing portion and a flange portion; and at least two elastic members each having opposite end portions fixed to the support members for supporting the support members; and a tension mask having opposite edges fixed to the fixing portions of the support members, respectively, in a state when the tension mask is being stretched in a stretching direction by a tensile stress tending to move the opposite edges of the tension mask away from each other;

wherein the flange portion of each of the support members has a width, as measure in the stretching direction, decreasing from a central region of said flange portion toward opposite ends thereof, thereby limiting a capability of a central region of the frame, which corresponds to the central regions of the flange portions, to deform in the stretching direction.

2. The assembly of claim 1, wherein the width of said flange portion becomes wider from locations where the associated support member is supported by the elastic members toward the central region of said flange portion.

3. The assembly of claim 1, wherein each of the support members has a L-shaped cross section with the associated fixing portion extending at a predetermined angle from an outer edge of the associated flange portion.

4. The assembly of claim 3, wherein the outer edge of each of the flange portions is rectilinear.

5. The assembly of claim 3, wherein each of the fixing portions extends upright from the outer edge of the associated flange portion.

6. A tension mask-frame assembly, comprising:

a frame comprising two support members spaced from each other, each of said support members comprising a fixing portion and a flange portion extending at a predetermined angle from the fixing portion; and at least two elastic members each having opposite end portions fixed to the support members for supporting the support members; and a tension mask having opposite edges fixed to the fixing portions of the support members in a state when the tension mask is being stretched in a stretching direction by a tensile stress tending to move the opposite edges of the tension mask away from each other;

wherein each of the support members has a deformability in the stretching direction which increases from a central region of said support member toward opposite ends thereof; and wherein the fixing portions of each of the support members is curved away from the other support member in the stretching direction.

7. The assembly of claim 6, wherein each of the support members has a L-shaped cross section with the associated fixing portion extending at the predetermined angle from an outer edge of the associated flange portion.

8. The assembly of claim 7, wherein an inner edge of each of the flange portions is curved inwardly of the frame and toward the other flange portion.

9. The assembly of claim 7, wherein the outer edge of each of the flange portions is curved away from the other flange portion in the stretching direction.

10. The assembly of claim 9, wherein an inner edge of each of the flange portions is rectilinear.

11. The assembly of claim 7, wherein each of the fixing portions extends upright from the outer edge of the associated flange portion.

* * * * *